United States Patent
Thorson et al.

(10) Patent No.: US 9,951,872 B2
(45) Date of Patent: Apr. 24, 2018

(54) MECHANICAL FACE SEAL

(71) Applicant: Caterpillar Inc., Peoria, IL (US)

(72) Inventors: Timothy Arthur Thorson, Morton, IL (US); Dennis Michael Turczyn, Edelstein, IL (US); Thierry Andre Marchione, Heber City, UT (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/744,263

(22) Filed: Jun. 19, 2015

(65) Prior Publication Data

US 2016/0369896 A1    Dec. 22, 2016

(51) Int. Cl.
*F16J 15/34*    (2006.01)

(52) U.S. Cl.
CPC ......... *F16J 15/3404* (2013.01); *F16J 15/344* (2013.01)

(58) Field of Classification Search
CPC ........ F16J 15/34; F16J 15/3404; F16J 15/344; F16J 15/3416; F16J 15/3424; F16J 15/3428
USPC ................ 277/358, 359, 345, 352, 408, 348
See application file for complete search history.

(56) References Cited

U.S. PATENT DOCUMENTS

| | | | | |
|---|---|---|---|---|
| 4,756,631 A | * | 7/1988 | Jones | E21B 10/22 175/359 |
| 4,789,251 A | * | 12/1988 | McPherson | F16C 17/04 175/320 |
| 6,149,160 A | * | 11/2000 | Stephens | F16C 17/026 277/399 |
| 2006/0103073 A1 | * | 5/2006 | Khonsari | F16J 15/3404 277/359 |
| 2008/0217861 A1 | | 9/2008 | Sei | |
| 2009/0194952 A1 | | 8/2009 | Alajbegovic | |
| 2010/0008190 A1 | | 1/2010 | Gray et al. | |
| 2011/0169225 A1 | | 7/2011 | Winkler et al. | |
| 2012/0112416 A1 | | 5/2012 | Berger et al. | |
| 2013/0285332 A1 | * | 10/2013 | Bishop | F16J 15/34 277/500 |

FOREIGN PATENT DOCUMENTS

| | | | |
|---|---|---|---|
| CN | 103143706 A | | 6/2013 |
| DE | 1 293 711 | * | 3/2003 |
| DE | 102010054113 A1 | | 12/2010 |
| DE | 202010012401 U1 | | 12/2010 |
| DE | 10 2012 019 044 | * | 4/2014 |

(Continued)

OTHER PUBLICATIONS

Electroplating—definition by The Free Dictionary wM.*
Slot—definition of slot by The Free Dictionary.*

*Primary Examiner* — Nathan Cumar
(74) *Attorney, Agent, or Firm* — Finnegan, Henderson, Farabow, Garrett & Dunner, L.L.P.; William R. Tinker (57) ABSTRACT

A mechanical face seal includes a seal ring, the seal ring including an inner circumferential surface, an outer circumferential surface, and a generally annular body extending between the inner and outer circumferential surfaces. An annular flange projects radially from the annular body to an outer perimeter of the flange and a sealing band is on the annular flange. A slot may extend radially into the seal ring from the inner circumferential surface of the seal ring. A cooling channel may be in and extend generally circumferentially through at least one of the annular body and annular flange.

3 Claims, 5 Drawing Sheets

(56) References Cited

FOREIGN PATENT DOCUMENTS

| | | | |
|---|---|---|---|
| DE | 102012019044 A1 | | 4/2014 |
| DE | 102013107642 | | 1/2015 |
| DE | 102014219700 | | 3/2016 |
| EP | 1126201 | | 8/2001 |
| EP | 1 293 711 | * | 3/2003 |
| EP | 2362122 A1 | | 8/2011 |
| GB | 2126289 | | 3/1984 |
| WO | WO 2014/161520 A2 | | 10/2014 |
| WO | 2014208235 | | 12/2014 |

* cited by examiner

MECHANICAL FACE SEAL

TECHNICAL FIELD

The present disclosure relates generally to a seal and, more particularly, to a mechanical face seal.

BACKGROUND

Mechanical face seals, sometimes referred to as face seals, metal face seals, metal-metal face seals, or similar terms, are used in many types of industrial equipment including mining trucks and track-type machines designed for hauling, excavating, and/or material moving, for example. Mechanical face seals are designed to protect machine components, such as bearings and drive train parts, for example, by keeping out dirt, mud, debris, etc., and by preventing leakage of protective lubricants such as grease and oil. Machines that employ mechanical face seals typically operate in environments that may be highly destructive to the seals themselves, as well as to the components they are designed to protect should the seals begin to leak or otherwise fail. As a result, they must be able to withstand heavy loads, high velocities, increased temperatures, and harmful effects of dirt and debris.

The use of mechanical face seals has greatly improved and extended the life of the various components they are designed to protect. However, these seals are still subjected to conditions that are destructive to the seals, and failure of such seals may occur rapidly and without warning. Such seals generally include a pair of interacting seal rings, one of which may rotate and the other of which may be stationary. Seal size, e.g., diameter of a seal ring, may vary depending on the size of the associated components protected by the seal and/or the size of the machine involved. Destructive temperatures may be reached adjacent the location where one sealing surface contacts another in view of the pressure between the pair of seal rings, and the relative movement of the sealing surfaces. For mechanical face seals that are large in diameter, for example in large machines where face seals may be on the order of three or more feet in diameter (typical face seal diameters may range between about 87 mm and about 780 mm), the surface velocity at the seal face may be substantial relative to much smaller seals since, for a rotating body, speed increases as diameter increases. This increase in velocity may result in increased heat and destructive forces. Under some conditions, dirt and debris can enter between the seal faces. This dirt and debris may increase the coefficient of friction between seal faces with resulting increase in temperature and seal ring heat damage. It would be beneficial to have an effective way to mitigate heat damage to face seals and make seal rings more durable.

The seal rings of mechanical face seals typically are manufactured by casting in view of the solid geometry of the seal rings. The casting process for seal rings employs specific alloy materials which may be costly. It also tends to yield seal rings that are heavier than they need to be, and more costly than they should be due to the increased alloy material. Solidly cast seal rings also have reduced thermal conductivity. As a result, heat generated at the interface where a pair of seal rings contact may be difficult to dissipate. Solid seal rings formed by casting have been successfully employed in heavy equipment for many years. However, it would be beneficial and desirable to develop a way to form seal rings with geometries that are optimized to be sufficiently robust so as to endure the forces to which they may be subjected, to use less expensive alloy or other material than in a casting process, to be lighter in weight, and to be capable of reducing heat build-up at the interface where a pair of seal rings contact.

A way to monitor friction in a mechanical seal with surfaces that move relative to one another is described in U.S. Patent Application Publication 2012/0112416 of Berger et al. that was published on May 10, 2012 ("the '416 publication"). Specifically, the '416 publication discloses stationary and rotating seal rings with interacting sealing surfaces, and a monitoring device associated with the stationary seal ring that employs a strain gauge to detect variations in friction at the sealing interface. The '416 publication discloses determining the friction torque at the stationary seal ring, and discloses that this enables a secure judgment of a "tribological" state at the sliding surfaces. In turn, this enables early intervention in taking measures against increased wear at the sliding surfaces between seal rings.

Although the monitoring device of the '416 publication may offer a way to detect variations in friction at the sealing face of the seal rings, it may be only partially effective and does not provide structures on the seal rings to counter heat build-up at the sealing face. The strain gauge employed in the '416 publication indirectly measures friction by sensing torque transmitted to the stationary seal ring. However, the monitoring device does not provide a way to mitigate temperature build-up and dissipate heat that occurs at the sealing face which could be detrimental to the seal. In addition, the '416 publication does not address the forming process for the seal rings or how the seal rings may be formed more economically and of lighter weight.

The mechanical face seal of the present disclosure addresses one or more of the needs set forth above and/or other problems of the prior art.

SUMMARY

In one aspect, a mechanical face seal ring comprises an inner circumferential surface, an outer circumferential surface, and a generally annular body extending between the inner and outer circumferential surfaces. The mechanical face seal also includes an annular flange that may project radially from the annular body, the annular flange having an outer perimeter. The mechanical face seal also may include a sealing band on the annular flange adjacent to the outer perimeter. The mechanical face seal also may include a slot extending radially into the seal ring from the inner circumferential surface.

In another aspect, a mechanical face seal ring comprises an inner circumferential surface, an outer circumferential surface, and a generally annular body extending between the inner and outer circumferential surfaces. The mechanical face seal also includes an annular flange that may project radially from the annular body, the annular flange having an outer perimeter. The mechanical face seal also may include a sealing band on the annular flange adjacent to the outer perimeter. The mechanical face seal also may include at least one cooling channel in and extending generally circumferentially through at least one of the annular body and annular flange around at least a portion of a circumference of the seal ring.

In another aspect, a mechanical face seal assembly comprises a stationary seal ring including an inner circumferential surface, an outer circumferential surface, an annular body extending between the inner and outer circumferential surfaces, an annular flange projecting radially from the annular body, the annular flange having an outer perimeter, and a sealing band on the annular flange. The mechanical face seal assembly also includes a movable seal ring including an inner circumferential surface, an outer circumferential surface, an annular body extending between the inner and outer circumferential surfaces, an annular flange projecting radially from the annular body, the annular flange having an outer perimeter, and a sealing band on the annular flange configured to be in sealing engagement with the sealing band of the stationary seal ring. The mechanical face seal assembly also may include a void formed within at least one of the annular body and annular flange of at least one of the stationary and movable seal rings.

DETAILED DESCRIPTION

Figure 1:
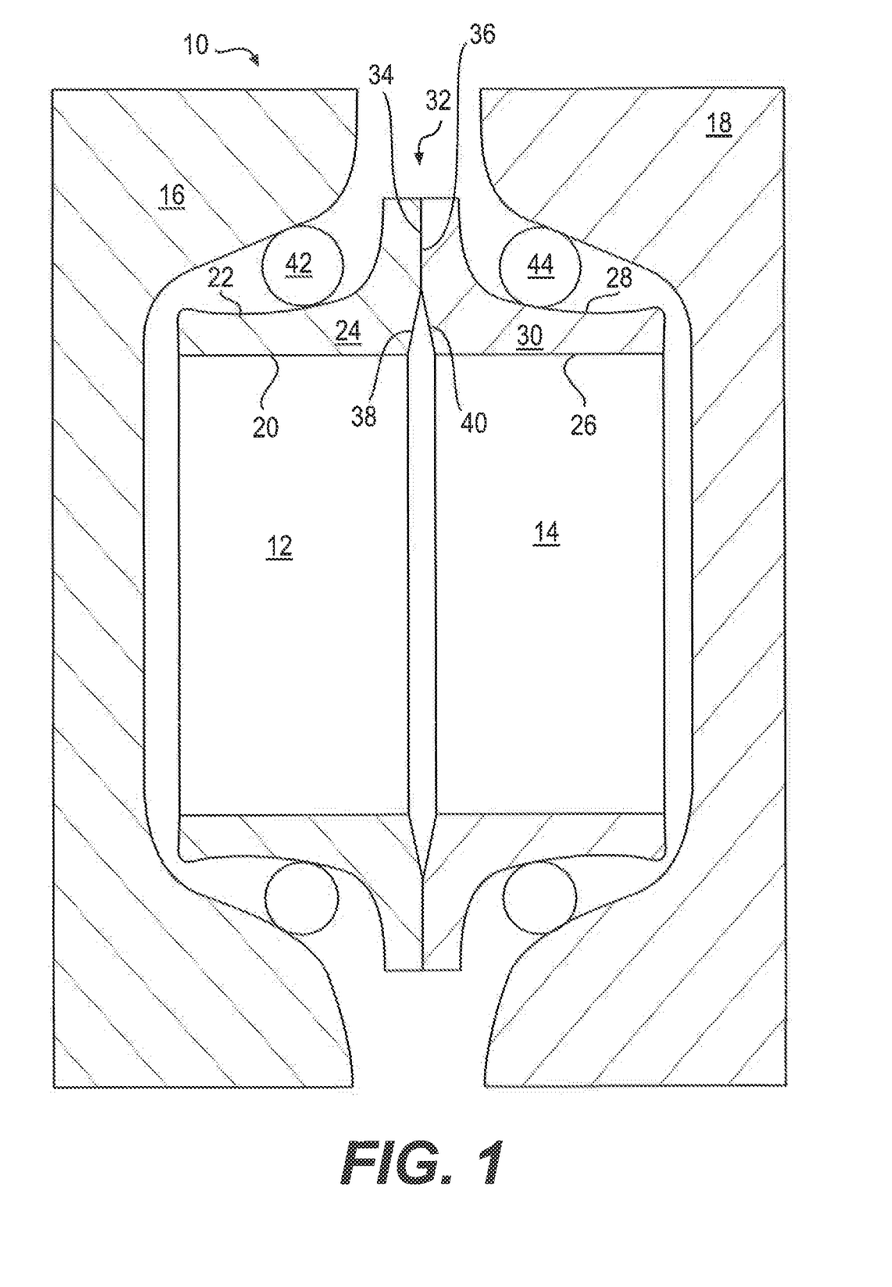
FIG. 1 is a schematic illustration of a cross-sectional view of part of a seal ring assembly according to an embodiment of the disclosure.

A cross-sectional view of an exemplary embodiment of a seal ring assembly 10 is illustrated schematically in FIG. 1. Seal ring assembly 10 may be used in various types of machines such as, for example, track-type machines used for excavating and material moving, mining trucks and other trucks used for hauling, and other machines used for excavating, material handling, hauling, farming, forestry, etc. Seal ring assembly 10 may include a pair of seal rings, one of which may be a stationary seal ring 12, and the other of which may be a movable seal ring 14. Stationary seal ring 12 may be fixed relative to a schematically illustrated stationary (e.g., non-rotating) machine part 16, such as a shaft supporting an idler roller of a propulsion track, and movable seal ring 14 may be fixed relative to a schematically illustrated second machine part 18, such as a track idler roller, that is movable (e.g., rotatable) relative to the stationary machine part 16. Seal ring 12, for example, may include an inner circumferential surface 20, an outer circumferential surface 22 and a generally annular body 24 extending between the inner circumferential surface 20 and outer circumferential surface 22. Seal ring 14, for example, may include an inner circumferential surface 26, an outer circumferential surface 28 and a generally annular body 30 extending between the inner circumferential surface 26 and outer circumferential surface 28.

The pair of seal rings 12, 14 may engage each other at an interface 32 between sealing band 34 of seal ring 12, and sealing band 36 of seal ring 14. Taper band 38 may be located adjacent sealing band 34 of seal ring 12, and taper band 40 may be located adjacent sealing band 36 of seal ring 14. As can be seen in FIG. 1, sealing bands 34 and 36 merge into respective taper bands 38 and 40. Toric 42 may engage the outer circumferential surface 22 of seal ring 12, and toric 44 may engage the outer circumferential surface 24 of seal ring 14. Torics 42 and 44 also typically may be referred to using the term load rings or other industry terms. Regardless what term may be used, torics 42 and 44 typically are formed of a durable and resilient natural or synthetic rubber-like material or elastomer (e.g., nitrile rubber, silicone rubber, etc.), and in use, may be under tension so as to bias seal rings 12 and 14 into pressure engagement at interface 32.

Figure 2:
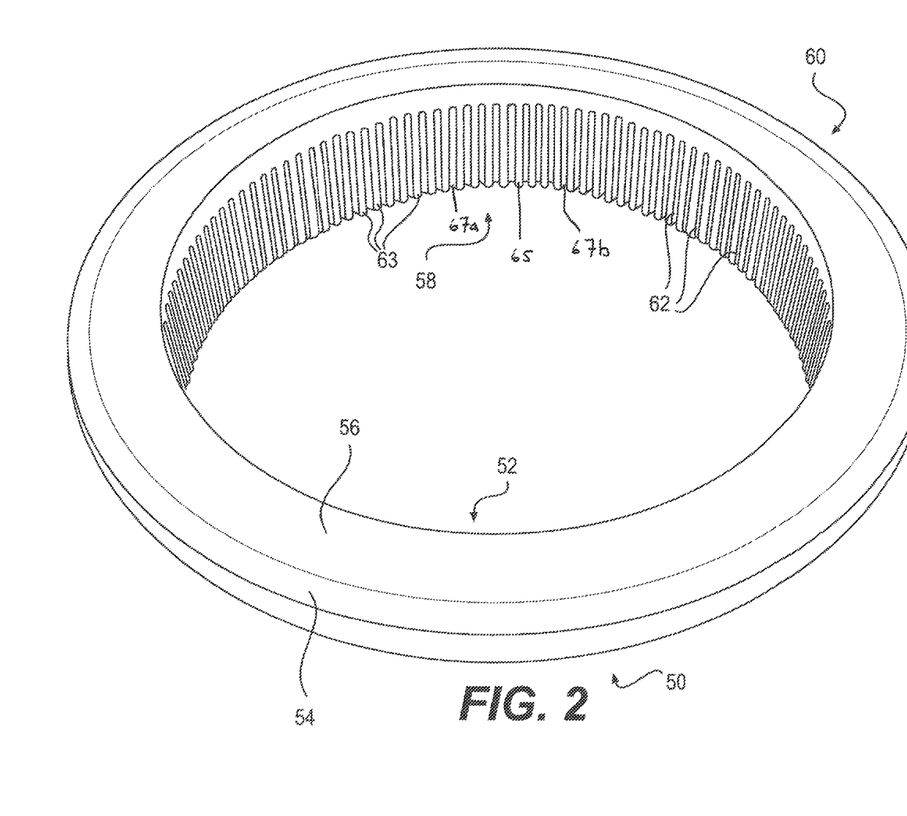
FIG. 2 is an isometric view of a seal ring according to an embodiment of the disclosure.

FIG. 2 is an isometric view of an embodiment of a seal ring 50 that may be used in a seal ring assembly 10 (FIG. 1). Seal ring 50 may be either a stationary seal ring or a movable seal ring. The view in FIG. 2 illustrates sealing end 52 of seal ring 50 with sealing band 54 and taper band 56. Also illustrated in FIG. 2 is a portion of the inner circumferential surface 58 of annular body 60. Voids in the form of a plurality of spaced slots 62 may be seen on inner circumferential surface 58. As illustrated, slots 62 each may be uniformly spaced from adjacent slots 62. A non-uniform spacing of slots 62 also is contemplated. Also as illustrated, slots 62 may extend substantially around the entire circumference of inner circumferential surface 58 (only a portion of which actually may be seen in the isometric view of FIG. 2), and may extend radially into seal ring 50 and within annular body 60. Embodiments wherein slots 62 extend only partially around the circumference of inner circumferential surface 58 are contemplated. A cooling fin 63 is defined by each two adjacent slots 62. Accordingly, a plurality of cooling fins 63 are defined by the plurality of circumferentially spaced slots 62. The inner radial surfaces 65 of cooling fins 63 that are viewed in FIG. 2 may be flush with inner circumferential surface 58, and the sides 67a, 67b of each cooling fin 63 may extend into and within annular body 60. Cooling fins 63 may be, in fact, integral with annular body 60.

Figure 3:
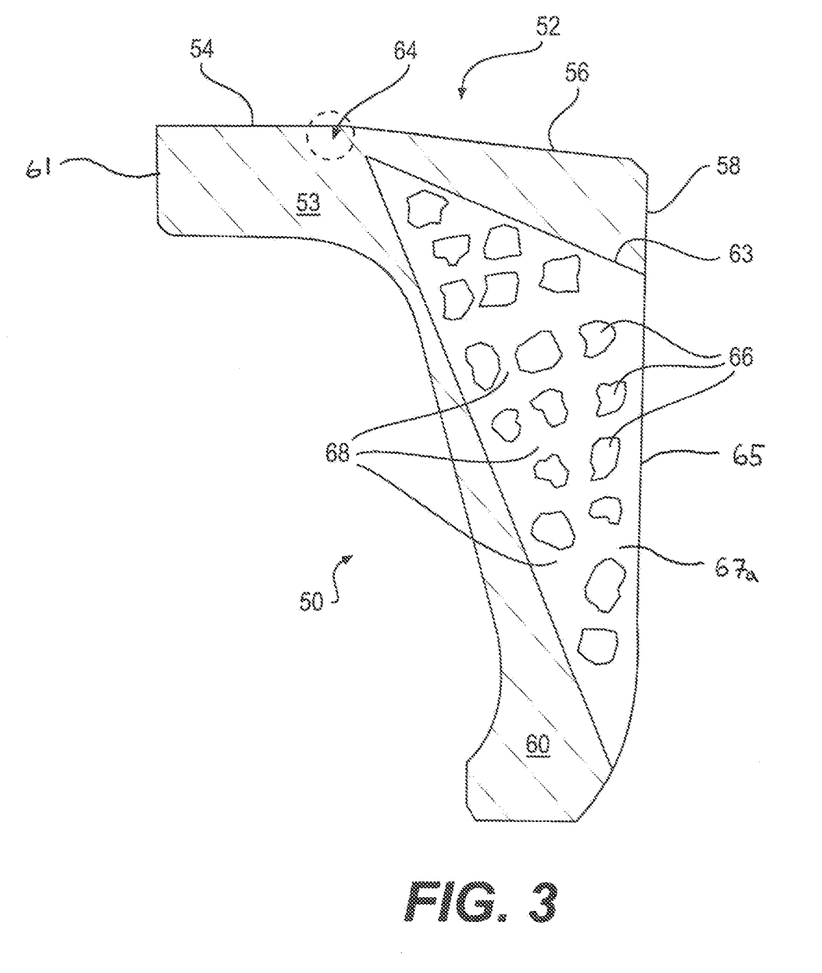
FIG. 3 is a schematic cross-sectional view of the seal ring of FIG. 2.

FIG. 3 is a schematic and stylized cross-sectional illustration of seal ring 50 including generally annular body 60 and annular flange 53 projecting radially from annular body 60 adjacent sealing end 52, the annular flange 53 having an outer perimeter 61. The seal ring 50 also includes a sealing band 54 on the annular flange 53 adjacent to the outer perimeter 61. A general shape and location of cooling fins 63 in one embodiment of seal ring 50 may be seen in FIG. 3. Cooling fin 63 is illustrated at its location along inner circumferential surface 58, and extending into and within annular body 60 and annular flange 53. Sealing end 52 is the area of seal ring 50 where it contacts another seal ring of a seal ring assembly in actual use. Sealing end 52 represents an area of heat build-up, primarily due to friction between seal ring 50 and the mating seal ring of a seal ring assembly. At sealing end 52, sealing band 54 merges into taper band 56. Heat build-up during use of seal ring 50 typically occurs at sealing band 54 and at a location adjacent sealing band 54 and adjacent an area 64 where sealing band 54 merges with taper band 56. Over time, as seal ring 50 wears, sealing band 54 gradually will wear down and taper band 56 gradually will begin to function as part of the sealing surface.

The stylized representation of cooling fin 63 seen in FIG. 3 may be substantially triangular in a cross-section of seal ring 50. A portion of cooling fin 63, as well as adjacent slots 62 (FIG. 2), may extend to a location within annular body 60 and annular flange 53 that is proximate sealing band 54 and adjacent area 64 where heat build-up during use of seal ring 50 typically occurs. It should be understood that, for purposes of this disclosure, "proximate" and "adjacent" are intended to mean near the area where heat build-up occurs so as to maximize conduction of heat away from the area of heat build-up by cooling fins 63, but without compromising the integrity of seal ring 50 at sealing band 54. As noted, part of taper band 56 may gradually become, in effect, part of sealing band 54 as sealing band 54 begins to wear down. As can be seen in FIG. 3, fin 63 may include one or more openings 66 extending transversely through cooling fin 63.

In the exemplary illustration in FIG. 3, cooling fin 63 includes a plurality of openings 66. In addition, it is contemplated that the openings 66 along with solid portions of cooling fin 63 may form a truss-like shape with solid portions acting as struts 68 and the openings 66 being surrounded by the struts 68.

Figure 4:
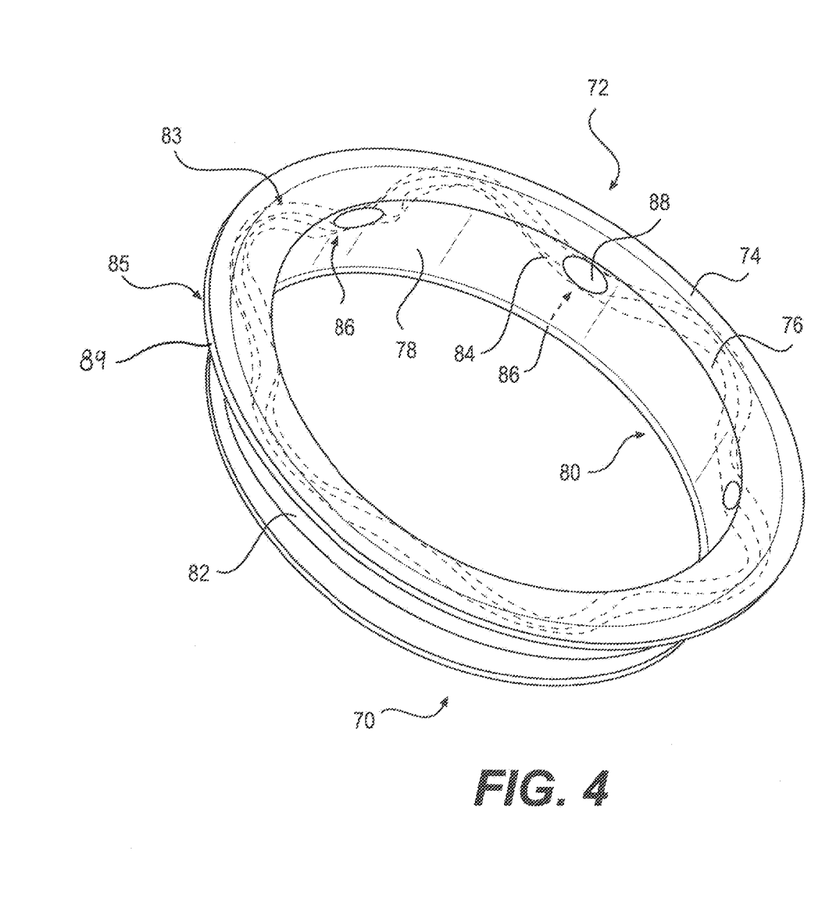
FIG. 4 is an isometric view of a seal ring according to an embodiment of the disclosure.

FIG. 4 is an isometric view of a seal ring 70. Seal ring 70 may be either a stationary seal ring or a movable seal ring. The view in FIG. 4 illustrates sealing end 72 with sealing band 74 merging into taper band 76. FIG. 4 also illustrates a portion of inner circumferential surface 78 of annular body 80, and a portion of outer circumferential surface 82 of annular body 80. The seal ring 70 also includes an annular flange 85 that projects radially from the annular body 80, the annular flange 85 having an outer perimeter 89. The seal ring 70 also includes the sealing band 74 on the annular flange 85 adjacent to the outer perimeter 89. A void 83 formed within annular body 80 and annular flange 85 of seal ring 70 may be seen in phantom lines in FIG. 4. In the exemplary embodiment of FIG. 4, void 83 is depicted as a cooling channel 84 in and extending generally circumferentially through annular body 80 and annular flange 85 around at least a portion of a circumference of seal ring 70.

As illustrated, channel 84 may pass entirely around annular body 80 and/or annular flange 85. Also, channel 84 may intersect inner circumferential surface 78 at one or more locations 86 and may include at least one opening 88 through the inner circumferential surface 78 of annular body 80 to facilitate fluid flow into the void 83 in the form of channel 84 during operation of a seal assembly. Also as illustrated, channel 84 may follow a serpentine path around annular body 80 and/or annular flange 85. It also is contemplated that channel 84 may follow a uniformly circular path, a spiral path, or an irregular path around annular body 80 and/or annular flange 85. It is further contemplated that more than one separate channel 84, i.e., a plurality of channels, may be provided in annular body 80 and/or annular flange 85, and each of such plurality of channels may pass entirely around annular body 80 and/or annular flange 85.

Figure 5:
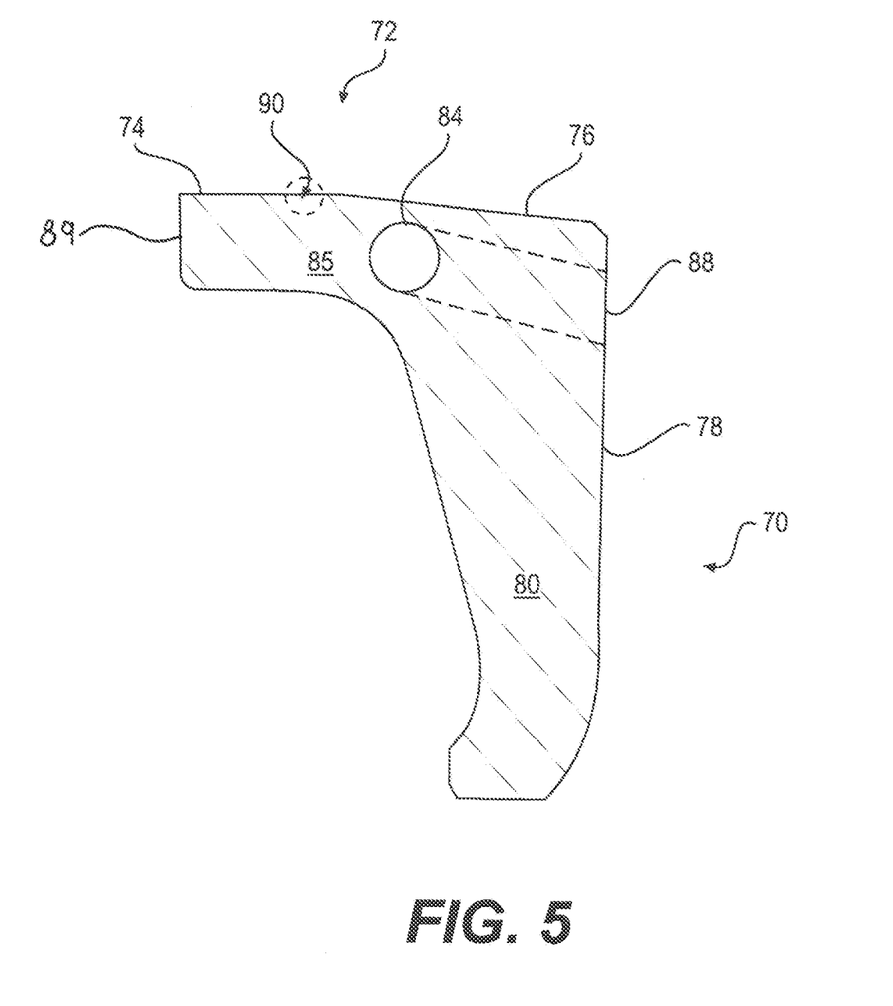
FIG. 5 is a schematic cross-sectional view of the seal ring of FIG. 4.

FIG. 5 is a schematic and stylized cross-sectional illustration of seal ring 70. A general location for channel 84 in one embodiment of seal ring 70 may be seen in FIG. 5. Sealing end 72 is the area of seal ring 70 where it contacts another seal ring of a seal ring assembly in actual use. Sealing end 72 represents an area of heat build-up, primarily due to friction between seal ring 70 and the mating seal ring of a seal ring assembly. At sealing end 72, sealing band 74 merges into taper band 76. Heat build-up during use of seal ring 70 typically occurs at sealing band 74 and at a location adjacent sealing band 74 and adjacent an area 90 where sealing band 74 merges with taper band 76. Similar to seal ring 50 described in connection with FIG. 3, over time, as seal ring 70 wears, sealing band 74 gradually will wear down and taper band 76 gradually will begin to function as part of the sealing surface.

The stylized representation in FIG. 5 schematically illustrates a general location for channel 84 in one embodiment of seal ring 70. A portion of channel 84 may be positioned and located within annular body 80 and/or annular flange 85 so that it passes within close proximity to sealing end 72 and adjacent area 90 where sealing band 74 merges with taper band 76 where heat build-up typically occurs. It should be understood that, for purposes of this disclosure, "within close proximity" and "adjacent" are intended to mean near the area where heat build-up occurs so as to maximize conduction of heat away from the area of heat build-up by fluid in channel 84.

Channel 84 may be configured for receiving a flow of a fluid as coolant to cool seal ring 70 during operation. Liquid present at the location where seal ring 70 is deployed, for example lubricating oil for machine parts at that location, may serve as fluid coolant. As viewed in FIG. 5, channel 84 (a portion of which is shown in broken lines) may intersect inner circumferential surface 78 at opening 88. As noted above in the description of FIG. 4, there may be a plurality of openings 88 spaced around the circumference of inner circumferential surface 78 through which cooling fluid, e.g., lubricant, may enter and exit channel 84.

It is contemplated that seal rings in accordance with disclosed embodiments may include both slots defining fins, as well as channels. In other words, a seal ring may include a plurality of voids in the form of slots, defining fins as disclosed in accordance with the embodiment of FIGS. 2 and 3, as well as one or more voids in the form of channels, as disclosed in accordance with the embodiment of FIGS. 4 and 5. In this manner, temperature mitigation and dissipation of heat that may build up adjacent an interface between the seal rings of a seal ring assembly may be maximized. Various factors may determine whether fins, channels, or both fins and channels, may be formed in a seal ring such as, for example, the size of the seal ring, and the particular part of a machine where the seal ring may be deployed.

The typical manner in which mechanical seal rings have been formed has been by casting. While it may be possible to manufacture seal rings including some of the aspects of disclosed embodiments by conventional casting techniques, the disclosed seal rings may be expeditiously manufactured using technology generally referred to as 3D printing, additive fabrication, additive manufacturing, and other terms. Hereinafter, the term additive manufacturing will be used, and for purposes of this disclosure additive manufacturing is characterized as meaning a process whereby solid objects are formed by building up individual elements, rows, or layers of materials that ultimately form the objects, and as including 3D printing and additive fabrication.

During additive manufacturing, material may be deposited, for example in successive layers, under the control of a computer. The computer may be controlled to deposit the successive layers by a digital model, e.g., a digital computer file, that represent a 3D image of a seal ring in accordance with the disclosure. The digital model may be on any type of computer-readable storage medium. Also, the digital model may be transmitted electronically, for example streamed, from a remote location to the location of manufacture of the seal ring. In this way, the digital model need not be stored at the location of manufacture.

The digital model may be formed in a number of ways. For example, a 3D scanner could be used, and energy, such as light or ultrasonic energy for example, may be projected onto an existing seal ring to be replicated. Energy reflected from the existing seal ring may be received, and a computer may generate a computer-readable digital model for use in manufacturing a seal ring. Alternatively, the 3D scanner may be a contact-type scanner that includes a probe to contact an existing seal ring to create the digital model. However, in order to initially manufacture a seal ring that includes internal features such as voids, for example channels or slots that define fins, the digital model may be formed by generating a virtual 3D model of such a seal ring using computeraided design (CAD) software. From the CAD virtual 3D model, a three-dimensional digital model representing the seal ring may be generated.

Using the digital model so generated, the seal ring may then be formed by additive manufacturing. It is contemplated that other techniques may be employed to generate a digital file or model that may enable additive manufacturing of the seal ring. The additive manufacturing process for forming the disclosed seal ring may involve various metals and/or metal alloys typically employed to fabricate seal rings (e.g., C6 nickel alloy, stellite iron alloy, NiHard iron alloy, or SAE 1074 steel). The process also may involve non-metallic materials including ceramic and/or composite material. Additional processing, such as cleaning, polishing, and material removal, for example, may be performed to refine the finished additive manufactured seal ring. It is contemplated that other processing may be performed subsequent to the additive manufacturing of the seal ring.

During the additive manufacturing, as layers of the material employed are built up, the location at which slots defining fins, channels, etc., may appear will be reached. At this point the components used to deposit the materials of which the seal ring is to be made may become inactive in order to form spaces between fins, openings transversely through fins, channel structure, etc. In this way, the seal rings ultimately may be formed with the fins and/or channels via the additive manufacturing process. As a result, the seal rings are lighter than seal rings formed by conventional casting techniques and are simultaneously provided with features that serve to mitigate temperature build-up and dissipate heat.

INDUSTRIAL APPLICABILITY

The disclosed seal rings may be used in those applications where a seal between movable parts of a machine may be needed. For example, where one part of a machine rotates relative to another part, seal rings in accordance with the disclosed embodiments may be used in order to seal out material which may contaminate the junction between the relatively rotating parts, and in order to seal in lubricants, such as oils or grease. The disclosed seal rings may be used, for example, in transmissions and other drive components of mining trucks and other hauling machine. The disclosed seal rings also may be used in the drive assemblies and track idler roller assemblies of track type machine.

The provision of cooling fins, channels for cooling fluid, and voids of various types forming pockets and/or cavities within the annular body and/or annular flange of a seal ring may imbue the seal ring with a number of advantages. Cooling fins and channels may give a movable seal ring a pump or turbine effect due to machine and seal ring motion. As a result the flow of lubricating oil, present in the area of a machine where the seal may be deployed, may be enhanced. This may lead to better lubrication of associated machine parts and more of a cooling effect, and may allow better lubrication and cooling at the interface of the sealing bands of a pair of seal rings. As a general rule, it is difficult to ensure that oil/lubricant arrives at the interface between two engaging seal rings where it may be needed, and measures which may be taken to help ensure oil flow to that location are decidedly advantageous. The fins and/or cooling channels formed within the annular body and/or annular flange may provide increased conduction and convection of heat in addition to coolant circulation via seal motion. Because the cooling fins and/or channels for coolant extend to locations in close proximity to the area of heat build-up at the interface between the sealing bands of a pair of metal face seals, the seal rings will tend to resist damaging heat build-up at the interface.

Forming spaced fins, fins with transverse apertures, and voids such as channels or cavities, will inherently result in removed material from an otherwise solid seal ring. As a further result, the material that is absent due to the formation of spaces between cooling fins, the transverse apertures through cooling fins, and voids such as channels or cavities, also may reduce the weight of a seal ring substantially. For example, it is contemplated that the weight of a seal ring formed in accordance with some disclosed embodiments may yield weight reductions on the order of 50%. Since seal rings formed by casting are already typically heavier than they need to be for the applications in which they are used, this reduction in weight is a significant advantage. The reduction in weight also may yield a concomitant reduction in the cost of manufacturing seal rings. The alloy materials employed for fabricating seal rings may be expensive, and a 50% weight reduction may yield a cost reduction of the same order.

For some machine that employ mechanical face seals, the speed of the machine may to some extent be limited by the face seals in drive components of the machine. For example, as machine speed increases, a movable face seal may move faster relative to a stationary face seal of a face seal assembly. With the increased relative movement, friction and heat build-up may increase. Typically, where speed at an interface is high, the pressure between seal rings of a pair of seal rings must be decreased to accommodate the increase in speed and still maintain heat build-up at a level that will not damage the seal rings. However, a decrease in pressure between seal rings increases the risk of contaminants at the interface between seal rings. By employing mechanical face seals in accordance with embodiments of this disclosure, adequate pressure may be maintained between seal rings even with increased speed since heat build-up may be less in view of the fact that heat may be more effectively and efficiently dissipated by the plurality of spaced cooling fins and/or one or more cooling channels. Accordingly, it may be possible to increase machine speed with less risk to damaging the seal rings of the metal face seals.

It will be apparent to those skilled in the art that various modifications and variations can be made to the mechanical face seals of the present disclosure without departing from the scope of the disclosure. Other embodiments will be apparent to those skilled in the art from consideration of the specification and practice employing the mechanical face seals disclosed herein. It is intended that the specification and examples be considered as exemplary only, with a true scope of the disclosure being indicated by the following claims and their equivalent.

What is claimed is:

1. A mechanical face seal ring, comprising:
    an inner circumferential surface;
    an outer circumferential surface;
    an annular body extending between the inner and outer circumferential surfaces;
    an annular flange projecting radially outward from the annular body;
    a sealing end of the mechanical face seal ring including a sealing band, wherein the sealing band is positioned on the annular flange adjacent to an outer perimeter of the annular flange projecting radially outward from the annular body;
    an internal cooling channel enclosed within the mechanical face seal ring and extending along a path which passes entirely around and throughout a circumference of the mechanical face seal ring through the annular body and the annular flange of the mechanical face seal ring;

the internal cooling channel including one or more first portions and one or more second portions;

wherein each of the one or more first portions of the internal cooling channel are positioned at a location within the annular flange proximate to the sealing band; and wherein each of the one or more second portions of the internal cooling channel are located within the annular body and intersect with the inner circumferential surface of the annular body at one of each of a plurality of openings spaced around a circumference of the inner circumferential surface and passing radially inward through the inner circumferential surface of the annular body and into the internal cooling channel through which a flow of fluid is received within and through the internal cooling channel to cool the mechanical face seal ring during operation.

2. The mechanical face seal ring of claim 1, wherein the path at which the internal cooling channel extends through the annular body and the annular flange of the mechanical face seal ring is a serpentine path.

3. The mechanical face seal ring of claim 1, wherein the sealing end of the seal ring includes a taper band located adjacent the sealing band and an area where the sealing band merges with the taper band, and wherein each of the one or more first portions of the internal cooling channel are positioned within the annular flange at a location within the annular flange adjacent to the area where the sealing band merges with the taper band.

* * * * *